US007708397B2

(12) United States Patent
Satoh

(10) Patent No.: US 7,708,397 B2
(45) Date of Patent: *May 4, 2010

(54) INK-JET RECORDING APPARATUS

(75) Inventor: Noriaki Satoh, Nagoya (JP)

(73) Assignee: Brother Kogyo Kabuhsiki Kaisha, Nagoya-shi, Aichi-ken (JP)

( * ) Notice: Subject to any disclaimer, the term of this patent is extended or adjusted under 35 U.S.C. 154(b) by 757 days.

This patent is subject to a terminal disclaimer.

(21) Appl. No.: 11/500,888

(22) Filed: Aug. 9, 2006

(65) Prior Publication Data

US 2007/0103527 A1 May 10, 2007

(30) Foreign Application Priority Data

Aug. 11, 2005 (JP) ............................ 2005-233342

(51) Int. Cl.
*G01D 11/01* (2006.01)

(52) U.S. Cl. ............................ 347/100; 347/84; 347/95

(58) Field of Classification Search ................. 347/100, 347/95, 96, 101, 84, 85; 106/31.6, 31.13, 106/31.27; 523/160
See application file for complete search history.

(56) References Cited

U.S. PATENT DOCUMENTS

2001/0044353 A1 * 11/2001 Nosaka et al. .............. 474/260
2005/0116984 A1 6/2005 Tsuda et al.

FOREIGN PATENT DOCUMENTS

JP 2005-119288 5/2005
JP 2006-063322 * 3/2006

* cited by examiner

*Primary Examiner*—Manish S Shah
(74) *Attorney, Agent, or Firm*—Banner & Witcoff, LTD

(57) ABSTRACT

The ink-jet recording apparatus has an ink passage into which a water-based ink or a preservation solution is filled. The ink passage employs a rubber member formed from an ethylene propylene diene rubber in which a sulfenamide-based vulcanization accelerator or a thiazole-based vulcanization accelerator is employed. The water-based ink has a dynamic surface tension at a lifetime of 100 ms of about 35 mN/m to about 45 mN/m as measured by means of a maximum bubble pressure method at a measurement temperature of 25° C. Furthermore, the preservation solution has a dynamic surface tension at a lifetime of 100 ms of about 30 mN/m to about 35 mN/m as measured by means of the maximum bubble pressure method at a measurement temperature of 25° C.

14 Claims, No Drawings

INK-JET RECORDING APPARATUS

BACKGROUND OF THE INVENTION

1. Field of the Invention

The present invention relates to an ink-jet recording apparatus in which insoluble materials originating from rubber members employed in an ink passage are prevented from precipitating into a water-based ink or a preservation solution filled into the ink passage.

2. Description of the Related Art

An ink-jet recording apparatus is an apparatus for performing recording by causing ink to adhere to a recording material such as recording paper by means of an ink ejection method such as a thermal method or a piezo method. In the thermal method, ink is rapidly heated to generate bubbles, and fine droplets of the ink are ejected from fine nozzles by utilizing the pressure generated by the rapid heating. In the piezo method, fine droplets of ink are ejected by use of a piezoelectric element.

In an ink-jet recording apparatus, rubber members are employed in an ink passage comprised of an ink tank, an ink-jet head and the ink. These rubber members include, but are not limited to, a cap which covers nozzles of the ink-jet head, a wiper which cleans the end face of the nozzles of the ink-jet head, a seal packing which is placed at the joint portion between components, and the like. In addition, if the ink tank is provided separately from the ink-jet head, the rubber members also include a tube which supplies ink from the ink tank to the ink-jet head, and the like.

However, when the rubber members come in contact with a water-based ink (hereinafter simply referred to as an ink) employed in ink-jet recording or with a preservation solution filled into an ink passage at the time of shipping or during long-term storage, the additives contained in the rubber members are dissolved in the ink or the preservation solution. The dissolved additives then precipitate as an insoluble material, thereby causing a problem such as clogging of nozzles of an ink-jet head.

In view of the above, a method has been proposed in US-A1-2005116984. In this method, rubber materials to be employed in an ink passage are immersed in water at 60° C. for a predetermined time in a sealed container for determining the amount of dissolved materials to thereby select suitable rubber materials.

However, the amounts and kinds of the insoluble materials precipitating into an ink or a preservation solution depend on the composition of the ink or the preservation solution. Therefore, even when the rubber materials selected by means of the method of US-A1-2005116984 are employed in the rubber members forming the ink passage, the problem of the precipitation of the insoluble materials occasionally arises. Specifically, the problem may arise when the composition of the ink is adjusted such that the ink has a dynamic surface tension preferable for ejection stability and when the composition of the preservation solution is adjusted such that the preservation solution has a dynamic surface tension preferable for replaceability with the ink and wettability.

SUMMARY OF THE INVENTION

In view of such problems in conventional technology, it is an object of the invention to prevent, in an ink-jet recording apparatus, insoluble materials originating from rubber members employed in an ink passage from precipitating. More specifically, the object is to prevent the insoluble materials from precipitating when an ink is employed which has a dynamic surface tension preferable for ejection stability and when a preservation solution is employed which has a dynamic surface tension preferable for wettability and replaceability with ink.

The present inventor has recognized that a sulfenamide-based vulcanization accelerator and a thiazole-based vulcanization accelerator have good compatibility with an ethylene propylene diene rubber polymer. Therefore, the inventor has formed rubber members employed in an ink passage of an ink-jet recording apparatus from an ethylene propylene diene rubber in which the sulfenamide-based vulcanization accelerator or the thiazole-based vulcanization accelerator is employed. Further, the inventors have prepared an ink and a preservation solution so as to have a specific dynamic surface tension. Consequently the inventors have found that the rubber is prevented from swelling by the ink and the preservation solution and that the precipitation of insoluble materials originating from the rubber members can be significantly suppressed in the ink and the preservation solution. The inventor has also found that ejection stability can be imparted to the ink and that excellent replaceability with ink and excellent wettability can be imparted to the preservation solution.

Accordingly, the present invention provides an ink-jet recording apparatus in which a water-based ink or a preservation solution is filled into an ink passage. The ink-jet recording apparatus is characterized in that a rubber member employed in the ink passage is formed from an ethylene propylene diene rubber in which a sulfenamide-based vulcanization accelerator or a thiazole-based vulcanization accelerator is employed, that the water-based ink comprises at least a coloring agent, water and a water-soluble organic solvent and has a dynamic surface tension at a lifetime of 100 ms of about 35 mN/m to about 45 mN/m as measured by means of a maximum bubble pressure method at a measurement temperature of 25° C., and that the preservation solution comprises at least water and a water-soluble organic solvent and has a dynamic surface tension at a lifetime of 100 ms of about 30 mN/m to about 35 mN/m as measured by means of the maximum bubble pressure method at a measurement temperature of 25° C.

In the ink-jet recording apparatus of the present invention, the rubber member employed in the ink passage is formed from the ethylene propylene diene rubber in which the sulfenamide-based vulcanization accelerator or the thiazole-based vulcanization accelerator is employed. Therefore, the compatibility between the vulcanization accelerator and an ethylene propylene diene rubber polymer serving as a rubber base polymer is excellent, and thus blooming is less likely to occur. In addition, since the ink and the preservation solution employed in the ink-jet recording apparatus each have a specific dynamic surface tension, the ink and the preservation solution do not excessively penetrate into the rubber. Therefore, the dissolution of additives, such as the vulcanization accelerator, in the ink or the preservation solution from the rubber can be suppressed. Thus, according to the present invention, the precipitation of insoluble materials originating from the rubber can be prevented in the ink or the preservation solution filled into the ink passage.

In addition, since the ink has a specific dynamic surface tension, the ink has excellent ejection stability. Furthermore, since the preservation solution has a specific dynamic surface tension, the preservation solution has excellent wettability in the ink passage and excellent replaceability with the ink.

DETAILED DESCRIPTION OF THE PREFERRED EMBODIMENTS

The present invention will next be described in detail.

The ink-jet recording apparatus of the present invention is characterized in that rubber members employed in part of an ink passage are formed from an ethylene propylene diene rubber in which a sulfenamide-based vulcanization accelerator or a thiazole-based vulcanization accelerator is employed. The apparatus is also characterized in that the compositions of an ink and a preservation solution employed in the apparatus are adjusted such that the ink and the preservation solution have respective specific dynamic surface tensions. The configuration of the ink-jet recording apparatus other than the above features may be the same as that of a known ink-jet recording apparatus. No limitation is imposed on an ink ejection method, and a thermal method, a piezo method or any other method may be employed.

In the ink-jet recording apparatus, the rubber members employed in a part of the ink passage include, but are not limited to, a cap which covers nozzles of an ink-jet head, a wiper which cleans the end face of the nozzles of the ink-jet head, and the like. In addition, if an ink tank is provided separately from the ink-jet head, the rubber members also include a tube which supplies ink from the ink tank to the ink-jet head. Further, the rubber members also include a seal packing which is an elastic member held between a buffer tank and a head unit, as disclosed in Japanese Patent Application No. 2004-207208.

As a rubber base polymer for these rubber members, an uncrosslinked ethylene propylene diene rubber polymer (EPDM) represented by the following formula is employed since the EPDM has excellent slidability and excellent compatibility with the sulfenamide-based vulcanization accelerator or the thiazole-based vulcanization accelerator:

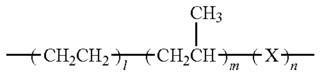

wherein X represents a nonconjugated diene compound such as ethylidene norbornene, dicyclopentadiene or 1,4-hexadiene. A commercial product may be employed as the ethylene propylene diene rubber polymer. Examples of this rubber polymer include, but are not limited to, EP331 (product of JSR Corporation), ESPRENE (registered trademark) 505 (product of SUMITOMO CHEMICAL CO., Ltd.) and the like.

As a vulcanization agent, zinc oxide, sulfur, an organic peroxide and the like may be employed singly or as a mixture of two or more. Of these, a combination of zinc oxide and sulfur is preferable since the vulcanization rate can be enhanced.

The mixing amount of the vulcanization agent depends on the type of the employed vulcanization agent. For example, for zinc oxide, the mixing amount is preferably about 2.5 parts by weight to about 7.5 parts by weight per 100 parts by weight of the rubber base polymer. When the mixing amount of the vulcanization agent is too low, the rubber members-are likely to swell by the ink or the preservation solution due to insufficient vulcanization. When the mixing amount is too high, insoluble materials are prone to precipitate in the ink or the preservation solution.

As the vulcanization accelerator, one or both of the sulfenamide-based vulcanization accelerator and the thiazole-based vulcanization accelerator are employed. The sulfenamide-based vulcanization accelerator and the thiazole-based vulcanization accelerator have excellent compatibility with the ethylene propylene diene rubber polymer. Therefore, when a rubber member in which these vulcanization accelerators are employed comes into contact with the ink or the preservation solution, these vulcanization accelerators can be prevented from dissolving from the rubber member.

Of these, a sulfenamide-based vulcanization accelerator having a molecular weight of about 200 to about 350 is preferable. The sulfenamide-based vulcanization accelerator releases sulfur to facilitate crosslinking. In the present invention, the rubber base polymer forming the rubber members is the ethylene propylene diene rubber polymer, which-has low polarity. Therefore, when the molecular weight of the sulfenamide-based vulcanization accelerator is too low, the intramolecular polarity increases in the sulfenamide-based vulcanization accelerator after the release of sulfur, resulting in a decrease in the compatibility with the ethylene propylene diene rubber polymer. On the contrary, when the molecular weight of the sulfenamide-based vulcanization accelerator is too high, this accelerator does not function satisfactorily as a vulcanization accelerator since the release amount of sulfur per a given amount of the sulfenamide-based vulcanization accelerator decreases.

As the sulfenamide-based vulcanization accelerator, a compound represented by the following formula (1) can be employed:

(1)

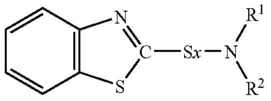

wherein $R^1$ and $R^2$ are independently a

group, H or a tert-butyl group; or $R^1$ and $R^2$ are joined to form a

ring; and X is 1 or 2. More specific examples of the sulfenamide-based vulcanization accelerator include, but are not limited to, N-cyclohexyl-2-benzothiazolyl sulfenamide (M. W.=264) represented by the following formula (1a):

(1a)

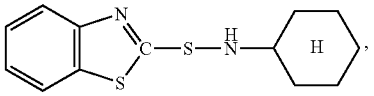

N-oxydiethylene-2-benzothiazolyl sulfenamide (M. W.=252) represented by the following formula (1b):

(1b)

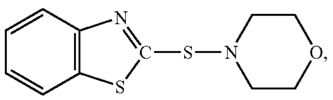

N-(tert-butyl)-2-benzothiazolyl sulfenamide (M. W.=238) represented by the following formula (1c):

(1c)

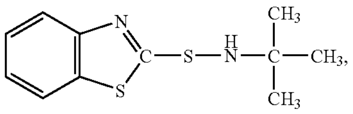

N,N-dicyclohexyl-2-benzothiazolyl sulfenamide (M. W.=346) represented by the following formula (1d):

(1d)

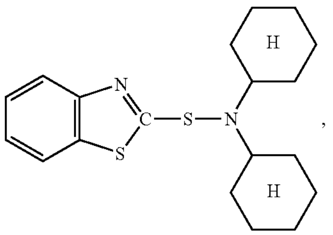

and the like.

Of these, N-cyclohexyl-2-benzothiazolyl sulfenamide represented by formula (1a) and N-oxydiethylene-2-benzothiazolyl sulfenamide represented by formula (1b) enhance the vulcanization rate and thus are preferable.

Further, a thiazole-based vulcanization accelerator having a molecular weight of about 150 to about 400 is preferable. Similar to the sulfenamide-based vulcanization accelerator, the thiazole-based vulcanization accelerator also releases sulfur to facilitate crosslinking. Therefore, as described above, when the molecular weight of the thiazole-based vulcanization accelerator is too low, the intramolecular polarity increases in the thiazole-based vulcanization accelerator after the release of sulfur, resulting in a decrease in the compatibility with the ethylene propylene diene rubber polymer. On the contrary, when the molecular weight of the thiazole-based vulcanization accelerator is too high, this accelerator does not function satisfactorily as a vulcanization accelerator since the release amount of sulfur per a given amount of the thiazole-based vulcanization accelerator decreases.

As the thiazole-based vulcanization accelerator, a compound represented by the following formula (2) can be employed:

(2)

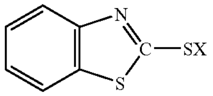

wherein X represents H,

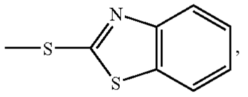

½ Zn,

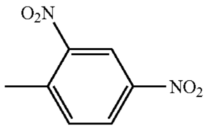

or

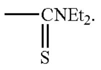

More specific examples of the thiazole-based vulcanization accelerator include, but are not limited to, 2-mercaptobenzothiazole (M. W.=167) represented by the following formula (2a):

(2a)

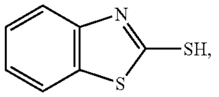

a zinc salt of 2-mercaptobenzothiazole (M. W.=397) represented by the following formula (2b):

(2b)

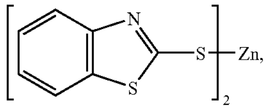

dibenzothiazyl disulfide (M. W.=332) represented by the following formula (2c):

(2c)

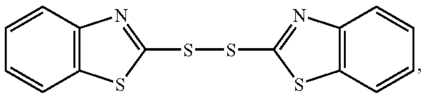

(2,4-dinitrophenyl)-2-mercaptobenzothiazole (M. W.=333) represented by the following formula (2d):

(2d)

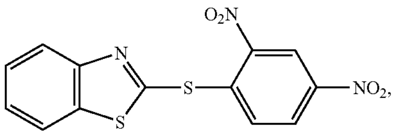

(N,N-diethylthiocarbamoylthio) benzothiazole (M. W.=282) represented by the following formula (2e):

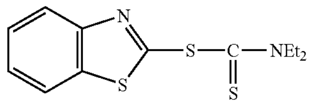

(2e)

and the like.

Of these, 2-mercaptobenzothiazole represented by the formula (2a) and the zinc salt of 2-mercaptobenzothiazole represented by the formula (2b) enhance the vulcanization rate and thus are preferable.

The preferred mixing amounts of the sulfenamide-based vulcanization accelerator and the thiazole-based vulcanization accelerator are determined such that the appropriate vulcanization rate is obtained. That is, the total amount of these vulcanization accelerators is preferably about 1 part by weight to about 3 parts by weight per 100 parts by weight of the rubber base polymer. When the mixing amount of the vulcanization accelerators is too low, a longer vulcanization forming time must be employed, causing a decrease in production efficiency. When the mixing amount of the vulcanization accelerators is too high, the dissolved amount in the ink or the preservation solution becomes large. Thus, disadvantageously, the precipitation of the vulcanization accelerators is likely to occur in the ink or the preservation solution.

In addition to the vulcanization agent and vulcanization accelerator, various additives may be added to the rubber composition in accordance with need. Examples of such additives include, but are not limited to: lubricants such as calcium stearate, stearic acid amide and magnesium oxide; fillers such as carbon black, calcium carbonate and silicon dioxide; softening agents such as paraffin oil; antioxidants; scorch retarders; and the like.

In a method of manufacturing the rubber members from the above rubber base polymer, kneading is performed by means of a kneading apparatus such as a Banbury mixer, a kneader or a twin roll mill. Further, heating is carried out normally at about 140° C. to about 200° C. for about 5 minutes to about 15 minutes in a heat molding step for the rubber. Particularly, when an organic peroxide is employed as the vulcanization agent, it is preferable that heat molding be performed at about 160° C. to about 180° C. for about 5 minutes to about 13 minutes followed by a further heat treatment at about 100° C. to about 150° C. for about 1 hour to about 24 hours. In this manner, unreacted organic peroxides and the like can be decomposed and removed, and the hardness can be slightly enhanced. However, if the heat treatment after the heat molding is performed at an excessively high temperature and/or for an excessively long time, the rubber is scorched disadvantageously.

Preferably, an ink which comes in contact with the above-mentioned rubber members in the ink passage in the ink-jet recording apparatus comprises at least a coloring agent, water and a water-soluble organic solvent. In addition, the ink preferably has a dynamic surface tension at a lifetime of 100 ms of about 35 mN/m to about 45 mN/m as determined by a maximum bubble pressure method at a measurement temperature of 25° C.

By setting the dynamic surface tension at a lifetime of 100 ms as determined by the maximum bubble pressure method at a measurement temperature of 25° C. to about 35 mN/m to about 45 mN/m, ejection stability from an ink-jet head can be imparted to the ink. If the dynamic surface tension is less than about 35 mN/m, a desirable meniscus is not formed at a nozzle of an ink-jet head, thereby causing difficulty in ejecting the ink as fine droplets. Moreover, the wettability of the ink to a recording material such as paper becomes excessively high, causing deterioration of print quality. On the contrary, if the dynamic surface tension exceeds about 45 mN/m, difficulty arises in introducing the ink into an ink-jet head, thereby causing a problem that the ink is not ejected.

It has been known that the dynamic surface tension is generally determined by an oscillating jet method, a meniscus method, the maximum bubble pressure method or other method. However, the value of the dynamic surface tension defined in the present invention is determined by means of the maximum bubble pressure method.

In the determination of the dynamic surface tension by means of the maximum bubble pressure method, a gas is fed from a gas supply source to a probe to generate a bubble at the end of the probe which is immersed in an ink. At this time, the generation rate of the bubble is changed by changing the flow rate of the gas. The pressure on the bubble from the ink is changed along with the bubble generation rate change, and the surface tension is determined through this pressure. The pressure reaches the maximum (the maximum bubble pressure) when the radius of the bubble becomes equal to the radius of the end portion of the probe. Thus, the dynamic surface tension a of the ink at this moment is represented by the following equation:

$$\sigma=(\Delta P \cdot r)/2$$

wherein r is the radius of the end portion of the probe, and ΔP is the difference between the maximum pressure and the minimum pressure on the bubble.

The term "lifetime" refers to a period of time from when a bubble is separated from the probe after the pressure reaches the maximum bubble pressure to form a new surface to when the pressure again reaches the maximum bubble pressure.

The mixing composition of water and the water-soluble organic solvent comprised of the ink is adjusted such that the above-mentioned condition for the dynamic surface tension is satisfied.

Specifically, a glycol ether is preferably employed as the water-soluble organic solvent. A glycol ether reduces the dynamic surface tension, moderately enhances the penetration rate of ink into a recording material such as paper, and improves the drying characteristics.

Specific examples of the glycol ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like. Of these, triethylene glycol butyl ether, dipropylene glycol propyl ether and the like are preferable since they are excellent in the capability of adjusting the dynamic surface tension and in print quality. These may be employed alone or as a mixture of two or more.

The amount of the glycol ether with respect to the total weight of the ink is preferably about 0.1 wt. % to about 10 wt. %, and more preferably about 4 wt. % to about 7 wt. %. Disadvantageously, if the amount of the glycol ether is too low, the dynamic surface tension becomes excessively high, and thus difficulty arises in introducing the ink into an ink-jet head. In addition, the penetration rate of the ink into a recording material is lowered, thereby causing problems in drying time and bleeding. On the contrary, disadvantageously, if the amount of the glycol ether is too high, the dynamic surface tension becomes excessively low. Thus, a desirable meniscus cannot be formed at a nozzle of an ink-jet head, and swelling occurs in the rubber members. In addition, since the ink excessively penetrates into a recording material, the ink reaches the back surface of the recording material, and blurring occurs considerably.

As the water-soluble organic solvent, a humectant for preventing drying of the ink at a nozzle and for improving the solution stability of the ink may be optionally added in addition to the glycol ether. Specific examples of the humectant include, but are not limited to: polyhydric alcohols such as ethylene glycol, propylene glycol, diethylene glycol, triethylene glycol, dipropylene glycol, polyethylene glycol, polypropylene glycol, 1,3-butanediol, 1,5-pentandiol, 1,6-hexanediol, glycerin, 1,2,6-hexanetriol, 1,2,4-butanetriol, 1,2,3-butanetriol and the like; nitrogen-containing heterocyclic compounds such as N-methyl-2-pyrrolidone, N-hydroxyethyl-2-pyrrolidone, 2-pyrrolidone, 1,3-dimethylimidazolidinone, ε-caprolactam and the like; amides such as formamide, N-methylformamide, N,N-dimethylformamide and the like; amines such as ethanolamine, diethanolamine, triethanolamine, ethylamine, diethylamine, triethylamine and the like; sulfur-containing compounds such as dimethyl sulfoxide, sulfolane, thiodiethanol and the like; and the like. These may be employed alone or as a mixture of two or more.

The amount of the humectant depends on the composition of the ink and the desired characteristics of the ink and is determined over a wide range. Normally, the amount of the humectant with respect to the total weight of each ink is preferably about 0 wt. % to about 40 wt. %, and more preferably about 0 wt. % to about 30 wt. %. The amount exceeding about 40 wt. % is not preferable since the viscosity of the ink unnecessarily increases to potentially cause problems such as difficulty in ejecting the ink from a nozzle of an ink-jet head and significant retardation of drying on a recording material.

Further, a monohydric alcohol such as ethanol or isopropyl alcohol may be employed for the purpose of controlling the penetrability of the ink into a recording material and the drying characteristics of the ink.

In order to prevent clogging of a nozzle, an ink filter and the like caused by impurities contained in water, the water employed in the ink is not ordinary tap water but preferably high purity water such as ion-exchanged water, distilled water or ultrapure water. The amount of the water with respect to the total weight of the ink is preferably about 10 wt. % to about 98 wt. %, more preferably about 30 wt. % to about 97 wt. %, and most preferably about 40 wt. % to about 95 wt. %.

AS the coloring agent, water-soluble dyes typified by direct dyes, acid dyes, basic dyes, reactive dyes and the like may be employed, and various inorganic pigments and organic pigments may also be employed. In addition, a self-dispersing type pigment may be employed which is obtained by subjecting a pigment to a surface treatment.

The ink employed in the ink-jet recording apparatus of the present invention comprises the coloring agent, the water and the water-soluble organic solvent as described above. In addition to the above, generally employed additives such as a dispersing agent, a viscosity modifier, a surfactant, a pH modifier and a preservative-mildewproofing agent may be added to the ink as an optional component in accordance with need. Among them, for achieving excellent print quality and for ease of introducing the ink, a polyoxyethylene alkyl ether sulfate-based surfactant represented by the following formula is preferably employed:

$$R-O-(CH_2CH_2O)_n-SO_3M$$

wherein R is an alkyl group having 12 to 15 carbon atoms, n is 2 to 4, and M is Na or triethanolamine. Examples of the surfactant which is commercially available include, but are not limited to: SUNNOL (a registered trademark) NL-1430, LMT-1430 and DM-1470 (products of LION Corporation); EMAL (a registered trademark) 20C, 20CM and 20T (products of Kao Corporation); SANDET (a registered trademark) EN, ET and END (products of Sanyo Chemical Industries, Ltd.); and the like.

Moreover, if the ink is applied to an ink-jet printer of a thermal type utilizing the action of thermal energy to eject the ink, an additive for adjusting thermal physical properties such as specific heat, thermal expansion coefficient and thermal conductivity may be employed.

In a conventional ink-jet recording apparatus, the ink having a dynamic surface tension of about 35 mN/m to about 45 mN/m adjusted by use of the above-mentioned components causes the precipitation of insoluble materials originating from the vulcanization accelerator into the ink. This results in that an ink filter is clogged and the ink is not ejected from a nozzle of an ink-jet head. However, in the ink-jet recording apparatus of the present invention, such problems are solved.

The preservation solution employed in the ink-jet recording apparatus of the present invention is prepared from the water and the water-soluble organic solvents such as the glycol ether, which are the same as those in the above-mentioned ink. However, the coloring agent may be omitted. Here, preferably, the dynamic surface tension at a lifetime of 100 ms as determined by the maximum bubble pressure method at a measurement temperature of 25° C. is adjusted to about 30 mN/m to about 35 mN/m. If this dynamic surface tension is less than about 30 mN/m, the wettability of the preservation solution to the rubber members becomes excessively high, and the penetrability also becomes excessively high. This causes a problem of dissolution of the vulcanization accelerator, and insoluble materials are prone to precipitate in the ink or the preservation solution. There arises another problem of swelling of the rubber members. On the contrary, if the dynamic surface tension exceeds about 35 mN/m, the preservation solution cannot be smoothly replaced with ink at the time of initial introduction of the ink into an ink-jet head.

In order for the preservation solution to have such a dynamic surface tension, the amount of the glycol ether with respect to the total weight of the preservation solution is preferably about 3 wt. % to about 10 wt. %, and more preferably about 4 wt. % to about 7 wt. %. Moreover, for ease of introducing the ink, an acetylene glycol-based surfactant represented by the following formula is preferably added:

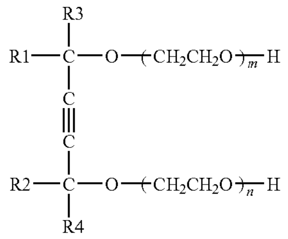

wherein the sum of m and n is 0 to 50, and R1, R2, R3 and R4 are independently an alkyl group.

Examples of the surfactant which is commercially available include, but are not limited to, OLFINE (a registered trademark) E1010 and E1004, SURFYNOL (a registered trademark) 104E (products of Nissin Chemical Industry Co., Ltd.) and the like.

EXAMPLES

The present invention will next be specifically described by way of examples.

(1) Preparation of Inks and Preservation Solutions

The compositions shown in Table 1 were employed for the inks and the preservation solutions, and all the components were stirred and mixed to obtain inks 1 to 5 and preservation solutions 1 to 4. In the ink compositions shown in Table 1, the actual mixing amount of each of the components is listed in weight percent (wt. %).

(2) Measurement of the Dynamic Surface Tension of the Inks and the Preservation Solutions The dynamic surface tension of each of the inks and each of the preservation solutions was measured by means of the maximum bubble pressure method at a lifetime of 20 ms to 5,000 ms and at a measurement temperature of 25° C. by use of an automatic dynamic surface tension meter (BP-D4, product of Kyowa Interface Science Co., LTD.). Then, the measurement value of the dynamic surface tension at a lifetime of 100 ms was read. The results are shown in Table 1.

(3) Evaluation of Ink Ejection Performance (Ejection Performance Evaluation)

Each of the inks was filled into a predetermined ink cartridge, and the ink cartridge was attached to a digital multifunction device equipped with an ink-jet printer (MFC-5200J, product of Brother Industries, Ltd.) in which the same ink had been filled into an ink passage in advance. A maintenance operation was then carried out for removing air bubbles generated in the ink passage, and the ratio of the number of nozzles having ejection failure to the total number of nozzles was determined at initial ejection immediately after completion of the maintenance operation. The ratio was evaluated by the following criteria. The results are shown in Table 3.

A: The ratio of the number of nozzles having ejection failure at the initial ejection is 10% or less.

B: The ratio of the number of nozzles having ejection failure at the initial ejection exceeds 10%.

(4) Preparation of Rubber Sheets

According to each of the rubber composition shown in Table 2, the components were successively fed to a rubber mixer, were kneaded, and were then discharged therefrom. The discharged mixture was extruded into a sheet-like shape by means of a biaxial extruder and then was put into a mold to be subjected to heat molding (at 170° C. for 10 minutes). Then, the sheets were heat treated in accordance with the conditions shown in Table 2 to thereby obtain rubber sheets 1 to 6 for evaluation.

(5) Evaluation of Precipitation of Rubber (Precipitation Evaluation)

Each of the rubber sheets prepared in (4) was cut to dimensions of 50 mm length, 10 mm width and 2 mm thickness to form a sample for evaluation.

According to the combinations of experimental examples A-1 to A-30 and B-1 to B-24 shown in Tables 3 and 4, each of the above-mentioned samples was immersed into 10 mL of the ink or the preservation solution in a sealed container and was left to stand for two weeks in a thermostatic bath at 60° C. Thereafter, the immersed sample was removed. For each case, the ink or the preservation solution after the removal of the immersed sample was filtrated with an electroformed filter (a pore size of 13 μm and an effective filtration area of 8 $cm^2$) to measure the time required for the filtration. In addition, as a control, the inks and the preservation solutions to which the sample was not added were left to stand under the same conditions as above (at 60° C. for two weeks) and were filtrated with an electroformed filter having the same specification as above to determine the time required for the filtration (the reference time). For each of the inks and each of the preservation solutions into which the sample was immersed, the ratio of the time required for the filtration to the reference time was determined and evaluated by the following criteria. The results are shown in Tables 3 and 4.

AA: the required filtration time is less than 130% of the reference time.

A: the required filtration time is at least 130% and less than 200% of the reference time.

B: the required filtration time is at least 200% and less than 400% of the reference time.

C: the required filtration time is at least 400% of the reference time.

The electroformed filters after the filtration were observed under a microscope, and it was found that the larger the ratio of the above-mentioned filtration time to the reference time, the more the-amount of the precipitates.

(6) Evaluation of the Weight Change of Rubber (Weight Change Evaluation)

For each of the rubber samples immersed into the ink or the preservation solution (at 60° C. for two weeks) in (5), the weight was measured before and after the immersion, and the weight change ratio was evaluated by the following criteria. The results are shown in Tables 3 and 4.

A: The weight change ratio is 0% to 5%.

B: The weight change ratio is less than 0% or exceeds 5%.

A weight change ratio of less than 0% means that the rubber is dissolved in the ink or the preservation solution. Further, a weight change ratio exceeding 5% means that the rubber is overswelled. For both the cases, ejection failure is likely to occur in actual use.

(7) Evaluation of Introduction Performance (Introduction Performance Evaluation)

The preservation solution 3 was introduced into an ink-jet head. Subsequently, an ink was filled into a predetermined ink cartridge, and the ink cartridge was attached to a digital multifunction device equipped with an ink-jet printer (MFC-5200J, product of Brother Industries, Ltd.). A maintenance operation was carried out for removing air bubbles generated in an ink passage. Then, the ratio of the number of ink ejectable nozzles in which the preservation solution was successfully replaced with the ink to the total number of nozzles was determined at initial ejection immediately after completion of the maintenance operation. The ratio was evaluated by the following criteria. The results are shown in Table 4.

A: The ratio of the number of the ink ejectable nozzles at the initial ejection is 90% or more.

B: The ratio of the number of the ink ejectable nozzles is less than 90%.

TABLE 1

(Unit: wt. %)

| | Ink 1 | Ink 2 | Ink 3 | Ink 4 | Ink 5 | Preservation Solution 1 | Preservation Solution 2 | Preservation Solution 3 | Preservation Solution 4 |
|---|---|---|---|---|---|---|---|---|---|
| C.I. Direct Yellow 86 | | 2.5 | | | | | | | |
| C.I. Acid Red 52 | 2.0 | | | 2.0 | | | | | |
| C.I. Direct Blue 199 | | | 3.0 | | 3.0 | | | | |
| Glycerin | 19.0 | 18.0 | 22.0 | 25.0 | 24.0 | 17.0 | 17.0 | 15.0 | 12.0 |
| Triethylene glycol-n-butyl ether | 8.5 | 7.0 | 3.0 | | | 4.5 | 5.0 | 7.0 | 11.0 |
| Dipropylene glycol-n-propyl ether | | | | 0.8 | 0.3 | | | | |
| OLFINE ® E1010*1 | | | | | | 0.3 | 0.3 | 0.3 | 0.5 |
| SUNNOL ® NL-1430*2 | 0.2 | 0.1 | 0.2 | 0.1 | 0.1 | | | | |
| Proxel XL-2(S)*3 | 0.2 | 0.2 | 0.2 | 0.2 | 0.2 | 0.2 | 0.2 | 0.2 | 0.2 |
| Water | Balance | Balance | Balance | Balance | Balance | Balance | Balance | Balance | Balance |
| Dynamic surface tension at a lifetime of 100 ms (mN/m) | 31.2 | 35.1 | 39.1 | 45.0 | 50.5 | 35.3 | 34.5 | 33.6 | 27.8 |

*1Acetylene glycol-based surfactant; product of Nissin Chemical Industry Co., Ltd.
*2Polyoxyethylene alkyl ether sulfate-based surfactant; product of LION Corporation
*3Mildewproofing agent; product of Arch Chemicals, Inc.

TABLE 2

(Unit: parts by weight)

| | | Rubber 1 | Rubber 2 | Rubber 3 |
|---|---|---|---|---|
| Polymer | Ethylene propylene diene rubber polymer* | 100 | 100 | 100 |
| Vulcanization agent | Zinc oxide | 5 | 5 | 5 |
| | Sulfur | 1.5 | 1.5 | 1.5 |
| Filler | Carbon black | 80 | 50 | 80 |
| Softening agent | Paraffin oil | 30 | 30 | 30 |
| vulcanization accelerator | Mixing amount | 1.5 | 1 | 1 |
| | Type | Sulfenamide-based | Sulfenamide based | Thiazole-based |
| | Abbreviation | CBS | OBS | MBT |
| | Compound name | N-cyclohexyl-2-benzothiazolyl sulfenamide | N-oxydiethylene-2-benzothiazolyl sulfenamide | 2-Mercaptobenzothiazole |
| | Structural formula | 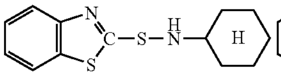 | 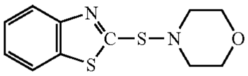 | 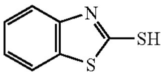 |
| | Molecular weight | 264 | 252 | 167 |

| | | Rubber 4 | Rubber 5 | Rubber 6 |
|---|---|---|---|---|
| Polymer | Ethylene propylene diene rubber polymer* | 100 | 100 | 100 |
| Vulcanization agent | Zinc oxide | 5 | 5 | 5 |
| | Sulfur | 1.5 | 1.5 | 1.5 |
| Filler | Carbon black | 80 | 80 | 80 |
| Softening agent | Paraffin oil | 30 | 30 | 30 |
| vulcanization accelerator | Mixing amount | 2 | 1.5 | 2 |
| | Type | Thiazole-based | Thiuram-based | Dithiocarbamate based |
| | Abbreviation | ZnMBT | TMTD | ZnEDC |
| | Compound name | Zinc salt of 2-mercaptobenzothiazole | Tetramethylthiuram disulfide | Zinc diethyldithiocarbamate |
| | Structural formula | 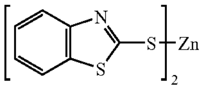 | 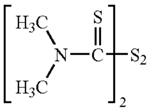 | 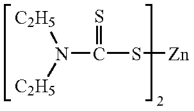 |
| | Molecular weight | 397 | 240 | 361 |

*EP331, product of JSR Corporation

TABLE 3

| Ex. No. | Rubber No. | Ink No. | Precipitation evaluation | Weight change evaluation | Ejection performance evaluation |
|---|---|---|---|---|---|
| A-1 | 1 | 1 | AA | B | B |
| A-2 | 1 | 2 | AA | A | A |
| A-3 | 1 | 3 | AA | A | A |
| A-4 | 1 | 4 | AA | A | A |
| A-5 | 1 | 5 | AA | A | B |
| A-6 | 2 | 1 | AA | B | B |
| A-7 | 2 | 2 | AA | A | A |
| A-8 | 2 | 3 | AA | A | A |
| A-9 | 2 | 4 | AA | A | A |
| A-10 | 2 | 5 | AA | A | B |
| A-11 | 3 | 1 | AA | B | B |
| A-12 | 3 | 2 | AA | A | A |
| A-13 | 3 | 3 | AA | A | A |
| A-14 | 3 | 4 | AA | A | A |
| A-15 | 3 | 5 | AA | A | B |
| A-16 | 4 | 1 | AA | B | B |
| A-17 | 4 | 2 | AA | A | A |
| A-18 | 4 | 3 | AA | A | A |
| A-19 | 4 | 4 | AA | A | A |
| A-20 | 4 | 5 | AA | A | B |
| A-21 | 5 | 1 | C | B | B |
| A-22 | 5 | 2 | B | A | A |
| A-23 | 5 | 3 | B | A | A |
| A-24 | 5 | 4 | B | A | A |
| A-25 | 5 | 5 | B | A | B |
| A-26 | 6 | 1 | C | B | B |
| A-27 | 6 | 2 | C | A | A |
| A-28 | 6 | 3 | C | A | A |
| A-29 | 6 | 4 | C | A | A |
| A-30 | 6 | 5 | B | A | B |

TABLE 4

| Ex. No. | Rubber No. | Preservation solution No. | Precipitation evaluation | Weight change evaluation | Introduction performance evaluation |
|---|---|---|---|---|---|
| B-1 | 1 | 1 | AA | A | B |
| B-2 | 1 | 2 | AA | A | A |
| B-3 | 1 | 3 | A | A | A |
| B-4 | 1 | 4 | C | B | A |
| B-5 | 2 | 1 | AA | A | B |
| B-6 | 2 | 2 | A | A | A |
| B-7 | 2 | 3 | A | A | A |
| B-8 | 2 | 4 | C | B | A |
| B-9 | 3 | 1 | AA | A | B |
| B-10 | 3 | 2 | AA | A | A |
| B-11 | 3 | 3 | A | A | A |
| B-12 | 3 | 4 | C | B | A |
| B-13 | 4 | 1 | AA | A | B |
| B-14 | 4 | 2 | AA | A | A |
| B-15 | 4 | 3 | A | A | A |
| B-16 | 4 | 4 | C | B | A |
| B-17 | 5 | 1 | C | A | B |
| B-18 | 5 | 2 | C | A | A |
| B-19 | 5 | 3 | C | A | A |
| B-20 | 5 | 4 | C | B | A |
| B-21 | 6 | 1 | C | A | B |
| B-22 | 6 | 2 | C | A | A |
| B-23 | 6 | 3 | C | A | A |
| B-24 | 6 | 4 | C | B | A |

As can be seen from the results in Tables 3 and 4, for the rubber sample 5 in which a thiuram-based vulcanization accelerator was employed and for the rubber sample 6 in which a dithiocarbamate-based vulcanization accelerator was employed, the precipitation evaluation results were unfavorable in all the inks and preservation solutions. On the other hand, for the rubber samples 1 and 2 in which the sulfenamide-based vulcanization accelerator was employed and for the rubber samples 3 and 4 in which the thiazole-based vulcanization accelerator was employed, the precipitation evaluation results were excellent in the inks 1 to 5 and the preservation solutions 1 to 3. However, since the preservation solution 4 comprises a larger amount of the glycol ether and has a dynamic surface tension of less than 30 mN/m, the precipitation evaluation results were unfavorable for all the rubber samples.

Further, the ink 1 and the preservation solution 4 comprises a large amount of the glycol ether. Therefore, since the wettability and also the penetrability become excessively high, the rubber sample swells, resulting in poor weight change evaluation results. The preservation solution 1 has the dynamic surface tension of more than 35 mN/m, therefore the introduction performance evaluation result was unfavorable for all the rubber samples.

The present invention is useful as an inkjet recording apparatus which does not suffer performance deterioration due to precipitates with an ink or a preservation solution filled therein.

The entire disclosure of the specification, claims and summary of Japanese Patent Application No. 2005-233342 filed on Aug. 11, 2005 is hereby incorporated by reference.

What is claimed is:

1. An ink-jet recording apparatus comprising:

an ink passage through which at least one of a water-based ink and a preservation solution flows; and a rubber member in the ink passage, said rubber member being formed from an ethylene propylene diene rubber in which a sulfenamide-based vulcanization accelerator or a thiazole-based vulcanization accelerator is employed, wherein the water-based ink includes at least a coloring agent, water and a water-soluble organic solvent, and has a dynamic surface tension at a lifetime of 100 ms of about 35 mN/m to about 45 mN/m as measured by means of a maximum bubble pressure method at a measurement temperature of 25° C., and wherein the preservation solution includes at least water and a water-soluble organic solvent, and has a dynamic surface tension at a lifetime of 100 ms of about 30 mN/m to about 35 mN/m as measured by means of the maximum bubble pressure method at a measurement temperature of 25° C.

2. The ink-jet recording apparatus according to claim 1, wherein the sulfenamide-based vulcanization accelerator has a molecular weight of about 200 to about 350.

3. The ink-jet recording apparatus according to claim 1, wherein the sulfenamide-based vulcanization accelerator is a compound represented by the following formula (1):

(1)

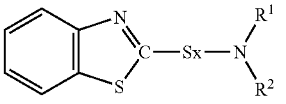

wherein $R^1$ and $R^2$ are independently a

group, H or a tert-butyl group; or $R^1$ and $R^2$ are joined to form a

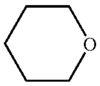

ring; and X is 1 or 2.

4. The ink-jet recording apparatus according to claim 3, wherein the sulfenamide-based vulcanization accelerator is N-cyclohexyl-2-benzothiazolyl sulfenamide represented by the following formula (1a):

(1a)

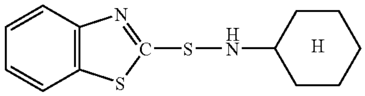

or N-oxydiethylene-2-benzothiazolyl sulfenamide represented by the following formula (1b):

(1b)

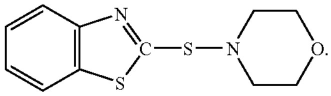

5. The ink-jet recording apparatus according to claim 1, wherein the thiazole-based vulcanization accelerator has a molecular weight of about 150 to about 400.

6. The ink-jet recording apparatus according to claim 1, wherein the thiazole-based vulcanization accelerator is a compound represented by the following formula (2):

(2)

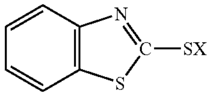

wherein X represents H,

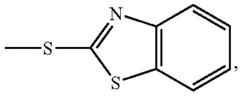

½ Zn,

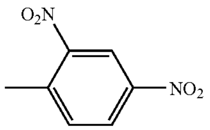

or

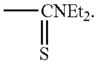

7. The ink-jet recording apparatus according to claim 6, wherein the thiazole-based vulcanization accelerator is 2-mercaptobenzothiazole represented by the following formula (2a):

(2a)

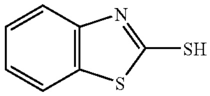

or a zinc salt of 2-mercaptobenzothiazole represented by the following formula (2b):

(2b)

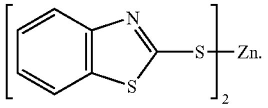

8. The ink-jet recording apparatus according to claim 1, wherein the water-based ink comprises glycol ether in an amount of about 0.1 wt. % to about 10 wt. % with respect to the total weight of the water-based ink.

9. The ink-jet recording apparatus according to claim 8, wherein the water-based ink comprises glycol ether in an amount of about 4 wt. % to about 7 wt. % with respect to the total weight of the water-based ink.

10. The ink-jet recording apparatus according to claim 1, wherein the water-based ink further comprises a polyoxyethylene alkyl ether sulfate-based surfactant represented by the following formula $$R—O—(CH_2CH_2O)_n—SO_3M$$

wherein R is an alkyl group having 12 to 15 carbon atoms, M=Na or triethanolamine, and n=2 to 4.

11. The ink-jet recording apparatus according to claim 1, wherein the preservation solution does not contain any coloring agent.

12. The ink-jet recording apparatus according to claim 1, wherein the preservation solution comprises glycol ether in an amount of about 3 wt. % to about 10 wt. % with respect to the total weight of the preservation solution.

13. The ink-jet recording apparatus according to claim 12, wherein the preservation solution comprises glycol ether in an amount of about 4 wt. % to about 7 wt. % with respect to the total weight of the preservation solution.

14. The ink-jet recording apparatus according to claim 1, wherein the preservation solution further comprises an acetylene glycol-based surfactant represented by the following formula:

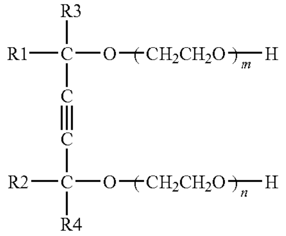

wherein R1, R2, R3 and R4 are independently an alkyl group, and the sum of m and n is 0 to 50.

* * * * *